United States Patent
Hohmann et al.

(10) Patent No.: US 8,302,509 B2
(45) Date of Patent: Nov. 6, 2012

(54) HYDRAULIC BOLT TENSIONING DEVICE AND METHOD FOR TIGHTENING LARGE BOLTS BY MEANS OF A HYDRAULIC BOLT TENSIONING DEVICE

(76) Inventors: Frank Hohmann, Warstein (DE); Jörg Hohmann, Meschede (DE)

( * ) Notice: Subject to any disclaimer, the term of this patent is extended or adjusted under 35 U.S.C. 154(b) by 288 days.

(21) Appl. No.: 12/871,086

(22) Filed: Aug. 30, 2010

(65) Prior Publication Data

US 2011/0048176 A1 Mar. 3, 2011

(30) Foreign Application Priority Data

Aug. 31, 2009 (DE) .................. 10 2009 043 907

(51) Int. Cl.
*B25B 29/02* (2006.01)
*G01N 3/08* (2006.01)
(52) U.S. Cl. ........................................ 81/57.38; 73/761
(58) Field of Classification Search .................... 29/452; 73/761, 826, 837, 856, 857; 81/54, 429, 81/57.38; 254/29 A
See application file for complete search history.

(56) References Cited

U.S. PATENT DOCUMENTS

| | | | | |
|---|---|---|---|---|
| 3,115,332 A | * | 12/1963 | Singleton et al. | 254/29 A |
| 4,047,456 A | * | 9/1977 | Scholz | 81/57.38 |
| 4,074,890 A | * | 2/1978 | Boudet et al. | 254/29 A |
| 4,815,344 A | * | 3/1989 | Nemec et al. | 81/57.38 |
| 5,343,785 A | * | 9/1994 | Holt et al. | 81/57.38 |
| 5,406,867 A | * | 4/1995 | Junkers et al. | 81/57.38 |
| 5,682,025 A | | 10/1997 | Hohmann et al. | |
| 6,167,764 B1 | * | 1/2001 | Calhoun | 73/837 |
| 7,062,998 B2 | * | 6/2006 | Hohmann et al. | 81/429 |
| 7,469,592 B2 | | 12/2008 | Hohmann et al. | |
| 7,661,336 B2 | * | 2/2010 | Hohmann et al. | 81/57.38 |

FOREIGN PATENT DOCUMENTS

DE 43 41 707 C2 9/1995

* cited by examiner

*Primary Examiner* — Robert Pezzuto
(74) *Attorney, Agent, or Firm* — Gudrun E. Huckett

(57) ABSTRACT

A hydraulic bolt tensioning device has a cylinder supported on a machine part that is to be clamped by threaded bolt and nut. An exchangeable bushing has a first end screwed onto a free threaded end of the threaded bolt that projects past the nut. A tensioning piston is seal-tightly guided in the cylinder and supported on a second end of the exchangeable bushing. A pressure medium is supplied into an annular space between cylinder and piston. A control device is provided for setting a nominal pressure of the pressure medium corresponding to a nominal pretension of the threaded bolt. A yield limit detection device detects whether a yield limit of the threaded bolt is reached during tensioning. A controller acts on a pressure relief device for pressure relief of the bolt tensioning device when reaching, or shortly after reaching, the yield limit of the threaded bolt.

11 Claims, 2 Drawing Sheets

HYDRAULIC BOLT TENSIONING DEVICE AND METHOD FOR TIGHTENING LARGE BOLTS BY MEANS OF A HYDRAULIC BOLT TENSIONING DEVICE

BACKGROUND OF THE INVENTION

The invention concerns a hydraulic bolt tensioning device for tightening and re-leasing highly loaded screws, comprising a cylinder that is supported on a machine part to be clamped by means of a threaded bolt and a nut; an exchangeable bushing that can be screwed onto a free threaded end of the threaded bolt; at least one pressure-loadable tensioning piston that is seal-tightly guided in the cylinder, is supported on an extension of the exchangeable bushing that is screwed onto the threaded end of the threaded bolt projecting past the nut, and forms with the cylinder an annular space; a pressure medium supply; an adjusting device for adjusting a nominal pressure corresponding to a nominal pretension; a device for pressure relief of the bolt tensioning device; and a pressure sensor.

Such a hydraulic bolt tensioning device is disclosed in U.S. Pat. No. 7,469,592 (US 2008/0173140) of instant applicant.

Bolt tensioning devices have the task of applying a precisely predetermined initial tightening force onto a threaded bolt in order to tighten or release the nut screwed onto the threaded bolt. For this purpose, an exchangeable bushing of the bolt tensioning device is screwed onto the projecting thread above a nut and then the bolt tensioning device is subjected to hydraulic pressure. This has the result that the threaded bolt is tensioned by being longitudinally expanded. The forces that are applied onto the threaded bolt are extremely high so that the threaded bolt and the bolt tensioning device and its individual parts are exposed to great loads. In order to prevent that these highly loaded individual parts upon tensioning of a threaded bolt will break because, as a result of surpassing the load changes that are absorbable by these parts, a fatigue fracture will occur, it is desired to exchange the parts that are at risk of fatigue fracture before such a fatigue fracture can occur. This is also true for the premature exchange of other wear parts, for example, seals. This is achieved by a so-called load-cycling counter that is switched for each actuation of pressure loading of the bolt tensioning device, wherein counting of idle strokes is prevented in that the load-cycling counter switches only above a predeterminable pressure. Such a load-cycling counter is disclosed in U.S. Pat. No. 5,682,025 of the instant applicant.

A further safety measure is disclosed in DE 43 41 707 A1 of the instant applicant that becomes effective when the exchangeable bushing that is in particular highly loaded in these hydraulic bolt tensioning devices, after a certain number of screw expansions, i.e., load changes in the area of the threaded bolt end, will tear off in individual cases before the calculated load changes have been reached.

Since in such a case the entire system will be relieved suddenly, the torn-off part of the exchangeable bushing, together with the piston and the cylinder, can be thrown off at significant energy and significant damage on neighboring machine parts as well as injuries to the operator may be caused. In order to prevent this, in DE 43 41 707 A1 of the instant applicant a catching device for these parts of the bolt tensioning device is provided.

The load-cycling counter disclosed in U.S. Pat. No. 5,682,025 as well as the hydraulic bolt tensioning device disclosed in DE 43 41 707 A1 with catching device have found acceptance in practice but these devices do not protect against tearing off of the threaded bolt to be tensioned which can occur in particular when the threaded bolt is already damaged by over expansion, by a defective thread, or by material defects.

SUMMARY OF THE INVENTION

The invention has therefore the object to propose a hydraulic bolt tensioning device for tightening and releasing highly loaded screws and a method for controlling pressure loading of the hydraulic bolt tensioning device with which tearing off of the threaded bolt can be prevented.

This object is solved for a hydraulic bolt tensioning device of the aforementioned kind by a yield limit detection device for detecting that the yield limit has been reached during tensioning of the threaded bolt and by a control device for pressure relief of the bolt tensioning device when reaching, or shortly after reaching, the yield limit of the threaded bolt to be tensioned and, in particular, by a differentiating device for the signals supplied by the pressure sensor for determining the pressure gradient during a pressure loading action and a controller that effects pressure relief of the bolt tensioning device when the pressure gradient before reaching the nominal pressure drops below a predetermined value.

The invention is based on the concept that the pressure increases linearly during a pressure loading action below the elastic limit of the threaded bolt. When the elastic limit has been reached, the pressure/time curve will flatten out, reach a maximum, and then drop again to the rupture load. In case of a screw material without yield limit, this curve is continuous, while for a screw material with yield limit the curve will drop from an upper yield limit to a lower yield limit and then will increase again to the maximum value to then drop again to the rupture load. The pressure gradient that is derived by differentiating this curve is thus constant up to the point of reaching the elastic limit and then drops continuously in case of a screw material without yield limit but suddenly for a screw material with yield limit.

When the threaded bolt is already damaged, for example, at the thread or because of a material defect or by overloading above mechanically permissible parameters, an over-proportional lengthening of the threaded bolt will occur that causes rupture when no pressure relief of the bolt tensioning device is realized. Rupture of the threaded bolt can be prevented according to the invention with great reliability so that the bolt tensioning device also cannot be thrown off and damage to neighboring machine parts or injuries of operators can be prevented. It should be noted that the catching device described in DE 43 41 707 A1 will be effective only when the exchangeable bushing tears off but not when the threaded bolt will break.

The pressure loading action can be realized by an electrically or pneumatically driven hydraulic device or by a hand pump.

Pneumatically driven hydraulic devices or hand pumps operate intermittently so that the differentiating device in this case is designed such that the pressure gradient is determined only during the pressure increase phase and the pressure relief is effected only when the pressure gradient drops below a predetermined value during a pressure increase phase before reaching the nominal pressure.

The differentiating device can be designed such that a pressure relief is effected when the pressure gradient, before reaching the nominal pressure, drops below a predetermined value that is close to the pressure gradient of the elastic range or when the pressure gradient, before reaching the nominal pressure, will become negative suddenly which is the case for a screw material with yield limit. In this case, pressure relief is realized very quickly after surpassing the elastic limit.

Rupture of the threaded bolt can also be prevented when the differentiating device is designed such that the pressure relief is effected when the pressure gradient, before reaching the nominal pressure, is equal to zero, i.e., the pressure relief is realized when the maximum of the pressure/time curve is reached.

The aforementioned task is solved also by a method for controlling the pressure loading action of a hydraulic bolt tensioning device of the aforementioned kind in that the pressure loading action of the bolt tensioning device at the point of reaching, or shortly after reaching, the yield limit of the threaded bolt to be tensioned is terminated by pressure relief, in particular in that the pressure gradient during a pressure loading action of the bolt tensioning device is determined by a differentiating device and a signal for triggering a quick pressure relief of the bolt tensioning device is generated when the pressure gradient, before reaching the nominal pressure, drops below a predetermined value, wherein the pressure gradient for an intermittent pressure loading action is determined only during the pressure increase phase and the signal for triggering a quick pressure relief is generated only when the pressure gradient drops below a predetermined value before reaching the nominal pressure during a pressure increase phase, or a fast pressure relief is effected when the pressure gradient, before reaching the nominal pressure, is equal to zero, or a fast pressure relief is effected when the pressure gradient suddenly becomes negative before reaching the nominal pressure.

Preferably, when triggering a fast pressure relief, an error message can be generated so that the operator immediately is informed of a defective threaded bolt.

BRIEF DESCRIPTION OF THE DRAWINGS

The invention will be explained in the following with the aid of an embodiment illustrated in drawing in more detail.

DESCRIPTION OF PREFERRED EMBODIMENTS

Figure 1:
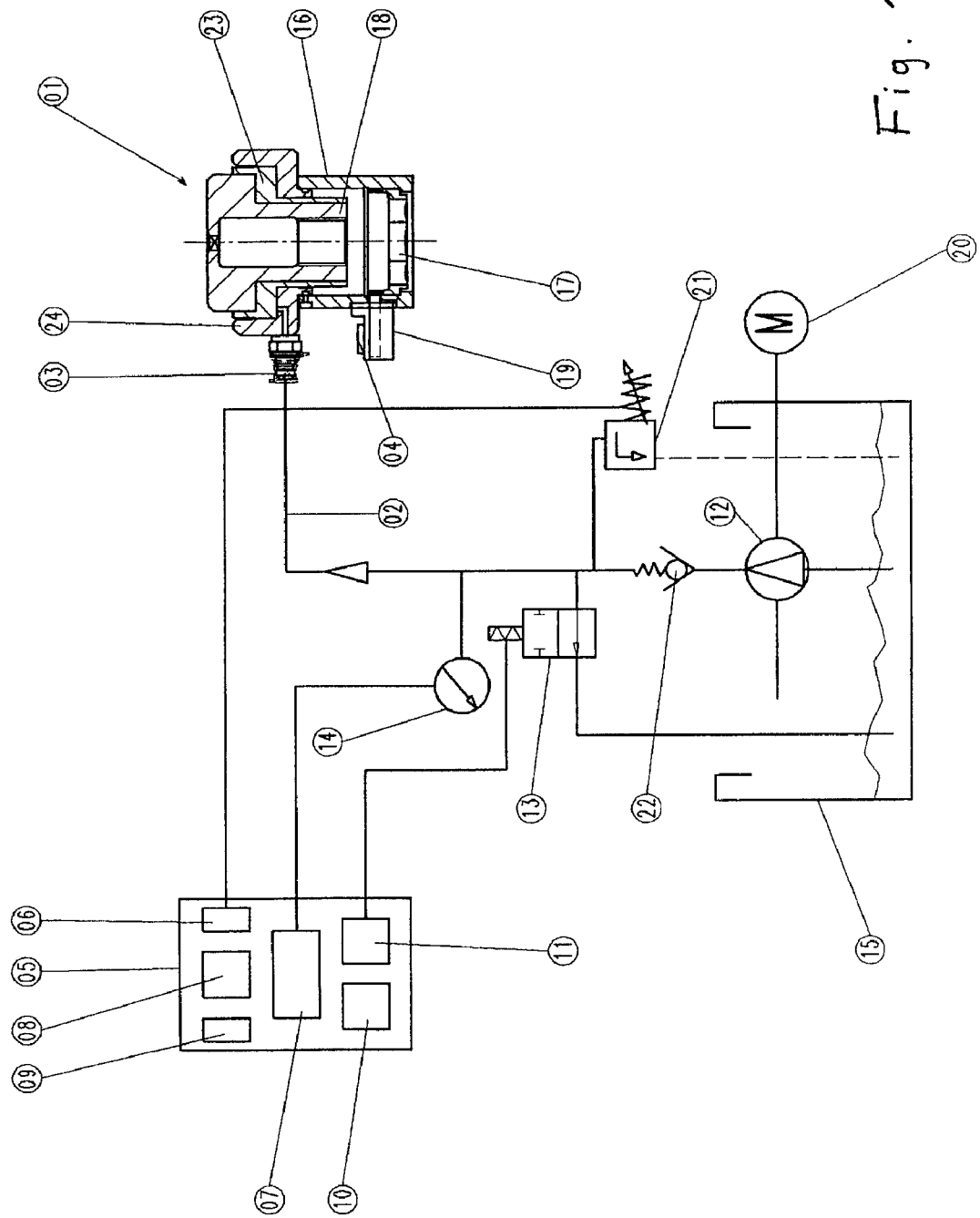
FIG. 1 shows a schematic illustration of a hydraulic bolt tensioning device with control device and hydraulic pressure source.

The hydraulic bolt tensioning device illustrated in the drawing and generally referred to by reference numeral 1 corresponds substantially to that of DE 43 41 707 A1 of the instant applicant.

A machine part, not illustrated, that e.g. may be a flange of a machine housing is to be clamped by means of a threaded bolt, also not illustrated, and a nut, not illustrated, that is screwed on.

In order to apply onto the threaded bolt a precisely controllable initial tension and in order to keep away torque from the threaded bolt that would constitute additional stress on the threaded bolt, the nut is screwed onto the threaded bolt initially by hand until the machine part is contacted. The length of the threaded bolt is dimensioned such that above the nut a free threaded end remains.

For tensioning the threaded bolt, the bolt tensioning device 1 is placed onto the nut that is screwed onto the threaded bolt wherein a rotary sleeve 16 provided with a hexagon socket 17 engages the nut positive-lockingly. An exchangeable bushing 18 is screwed with a first end onto the projecting free threaded end of the threaded bolt and is connected with a second end to tensioning piston 23 within the cylinder 24 of the bolt tensioning device 1. Once the bushing 18 is screwed onto the free end of the threaded bolt, the bolt tensioning device 1 is ready for use. A hydraulic pump 12, which in the illustrated embodiment may be driven by an electric drive motor 20, pneumatically or by hand, is connected by means of an electric directional valve 13, a pressure medium supply 2, a no-return valve 22, and a pressure medium connector 3 to the bolt tensioning device 1 and enables pressure loading of the pressure medium supply 2 or pressure relief to a collecting container 15. The directional valve 13 makes it possible to provide very quickly a pressure relief toward the collecting container 15, as needed.

The rotary sleeve 16 is provided with an outer toothing engaged by a gear of a gear system 19. To the gear system 19 a rotary drive 4 is connected that engages a square socket of the gear system 19.

A control device 5 is connected to the rotary drive 8, the electric directional valve 13, a pressure sensor 14 and an adjustable pressure control valve 21.

The pressure sensor 14 measures the pressure that is supplied by means of the hydraulic pump 12 to the pressure medium supply 6.

The control device 5 has an input device 6 for inputting the nominal initial tension of the threaded bolt or the nominal pressure of the hydraulic pump 12, derived therefrom and the surface area of the piston of the bolt tensioning device 1, and effects a corresponding adjustment of the pressure control valve 21, as well as an input device 9 for a nominal pressure gradient that serves as a pressure relief parameter when, before reaching the set nominal pressure for the respective screw connection, the pressure gradient drops below the nominal pressure gradient set by means of the input device 9.

The control device 5 comprises a computer 7, a differentiation device 10 for processing the signals transmitted by the pressure sensor 14 to detect whether the yield limit has been reached, and a controller 11 for controlling the pressure medium supply 2 to the bolt tensioning device 1 by means of the electric directional valve 13 acting as a pressure relief device.

Figure 2:
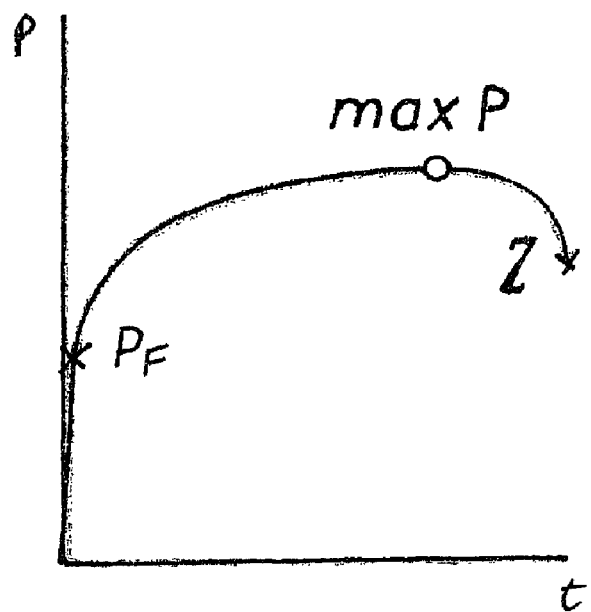
FIG. 2 shows a pressure/time curve of a screw material without yield limit.

FIG. 2 shows a pressure/time curve for a screw material without yield limit. Up to the yield point $P_F$ the pressure and the pretension that is thus applied by the bolt tensioning device 1 onto the threaded bolt increase in a linear fashion. Beginning at the yield point $P_F$, the slope will decrease, i.e., the pressure gradient decreases to zero up to the maximum value maxP, and then drops at negative pressure gradient to the rupture load Z.

Figure 3:
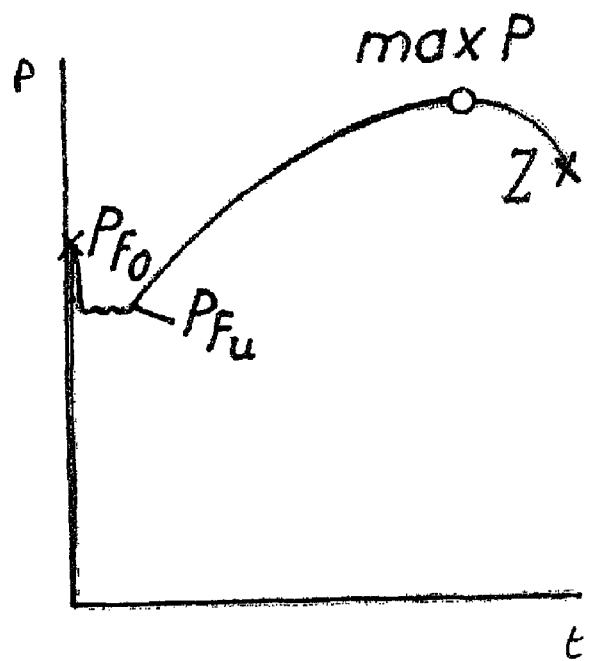
FIG. 3 shows a pressure/time curve of a screw material with yield limit.

In FIG. 3 the course of the pressure/time curve for a material with yield limit is illustrated. This curve is essentially applicable for steel materials. In this case, the pressure increases linearly up to the upper yield point $P_{Fo}$, and then drops suddenly to the lower yield point $P_{Fu}$ and then increases continuously with gradually decreasing pressure gradient up to the maximum value maxP in order to then drop at negative pressure gradient to the rupture load Z.

These curves are generally applicable so that the threaded bolts conventionally are pretensioned up to a value below the values $P_F$ or $P_{Fo}$; accordingly, the nut screwed onto the threaded end of the threaded bolt is then tightened by means of rotary drive 4 with such a torque that settling of all parts to be clamped is achieved and, subsequently, the bolt tensioning device 1 can be pressure-relieved by opening the electric directional valve 16 toward the collecting container 15. This pressure relief action is realized automatically by the control device 5 in accordance with a nominal pressure that has been input beforehand by means of the input device 6 and is, for example, 90% of the yield point $P_F$ or $P_{Fo}$.

By means of the differentiating device 10 the pressure signals that are supplied by the pressure sensor 14 to the control device 5 are continuously differentiated in order to determine the pressure gradient of the pressure/time curve. As long as the pressure build-up is still below the elastic limit $P_F$ or $P_{Fo}$, the pressure gradient is constant and the pressure relief can be realized after reaching the set nominal pressure and tightening of the nut.

When the threaded bolt has a damage on the thread or on the shaft, for example, in the form of a crack, or a material defect is present that reduces the effective cross-section of the threaded bolt, the elastic limit $P_F$ or $P_{Fo}$ is reached before the nominal pressure is reached and the pressure gradient becomes smaller or even negative. In order to avoid in this case that the threaded bolt is torn off by overload, by means of the control device 5 a signal is supplied to the electric directional valve 13 that effects an immediate and fast pressure relief to the collecting container 15. At the same time, in the display field 8 of the control device 5 an error message is generated so that the operator receives information in regard to the damaged threaded bolt that can then be immediately exchanged. At the same time, the hydraulic pump 12 is switched off in order to avoid unnecessary conveyance of hydraulic fluid at high pressure.

When the hydraulic pump 12 has an electric drive, the hydraulic fluid conveyance is continuous and the pressure/time curves correspond to FIGS. 2 and 3. When the hydraulic pump 12 is actuated by hand or pneumatically, conveyance of the hydraulic fluid is intermittent so that pressure increase phases and constant pressure phases alternate. In this case, the computer 7 in the control device 5 is designed such that the pressure gradient will be determined only during the pressure increase phase and the pressure relief will be effected only when the pressure gradient, before reaching the nominal pressure, will drop below a predetermined value during a pressure increase phase. This predetermined value of the pressure gradient can be input by means of an input device 9 of the control device 5 and can be, for example, 90% or less of the pressure gradient in the elastic range, for example, can also be equal to zero or negative. For a material of the threaded bolt that behaves in accordance with FIG. 2, the pressure relief can thus be achieved somewhat above the yield point $P_F$ that applies to the damaged threaded bolt or at the maximum of the pressure/time curve or shortly thereafter, in any case before reaching the rupture load Z. For a material that behaves in accordance with FIG. 3, in particular, carbon steel, the pressure relief is preferably realized when the pressure gradient becomes negative after the point $P_{Fo}$.

With the configuration of the control of the hydraulic bolt tensioning device in accordance with the invention, tearing off of a damaged threaded bolt upon tensioning by means of a hydraulic bolt tensioning device can be prevented reliably.

The specification incorporates by reference the entire disclosure of German priority document 10 2009 043 907.2 having a filing date of Aug. 31, 2009.

While specific embodiments of the invention have been shown and described in detail to illustrate the inventive principles, it will be understood that the invention may be embodied otherwise without departing from such principles.

What is claimed is:

1. A hydraulic bolt tensioning device for tightening and releasing highly loaded threaded bolts, the hydraulic bolt tensioning device comprising:
   a cylinder that is supported on a machine part that is to be clamped by a threaded bolt and a nut;
   an exchangeable bushing having a first end adapted to be screwed onto a free threaded end of the threaded bolt which free threaded end projects past the nut;
   a pressure-loadable tensioning piston that is seal-tightly guided in the cylinder and is supported on an extension of a second end of the exchangeable bushing;
   a pressure medium supply supplying pressure medium into an annular space between the cylinder and the piston;
   a control device for setting a nominal pressure of the pressure medium corresponding to a nominal pretension of the threaded bolt;
   a pressure relief device;
   a pressure sensor;
   a yield limit detection device for detecting that a yield limit of the threaded bolt is reached during tensioning of the threaded bolt;
   a controller acting on the pressure relief device for pressure relief of the bolt tensioning device at the time of reaching, or shortly after reaching, the yield limit of the threaded bolt being tensioned.

2. The hydraulic bolt tensioning device according to claim 1, wherein the yield limit detection device is a differentiating device for determining a pressure gradient during pressure loading of the bolt tensioning device, wherein the controller effects pressure relief when the pressure gradient drops below a predetermined value before reaching the nominal pressure.

3. The hydraulic bolt tensioning device according to claim 2, wherein, for an intermittently acting pressure loading of the bolt tensioning device, the differentiating device determines the pressure gradient only during a pressure increase phase of the intermittently acting pressure loading and the pressure relief is effected only when the pressure drops during a pressure increase phase below a predetermined value of the pressure gradient before reaching the nominal pressure.

4. The hydraulic bolt tensioning device according to claim 2, wherein the differentiating device effects pressure relief when the pressure gradient becomes equal to zero before reaching the nominal pressure.

5. The hydraulic bolt tensioning device according to claim 2, wherein the differentiating device effects pressure relief when the pressure gradient becomes suddenly negative before reaching the nominal pressure.

6. A method for control of pressure loading of a hydraulic bolt tensioning device according to claim 1, comprising the steps of:
   detecting a yield limit of a threaded bolt to be tensioned during pressure loading; and
   terminating by a pressure relief action pressure loading of the bolt tensioning device at the time of reaching, or shortly after reaching, the yield limit of the threaded bolt being tensioned.

7. The method according to claim 6, wherein, in the step of detecting, a pressure gradient during pressure loading of the bolt tensioning device is determined by a differentiating device, further comprising the step of generating a signal for triggering fast pressure relief of the bolt tensioning device when the pressure gradient drops below a predetermined value before reaching the nominal pressure.

8. The method according to claim 7, wherein, during an intermittent pressure loading, the pressure gradient is determined only during a pressure increase phase and the signal for triggering a fast pressure relief is generated only when the pressure gradient drops below a predetermined value during a pressure increase phase before reaching the nominal pressure.

9. The method according to claim 7, wherein fast pressure relief is triggered when the pressure gradient is equal to zero before reaching the nominal pressure.

10. The method according to claim 7, wherein fast pressure relief is triggered when the pressure gradient suddenly becomes negative before reaching the nominal pressure.

11. The method according to claim 7, further comprising the step of generating an error message when a fast pressure relief is triggered.

* * * * *